United States Patent
Burzese

(10) Patent No.: US 10,471,794 B2
(45) Date of Patent: Nov. 12, 2019

(54) BRACKET WITH OPEN CHANNEL

(71) Applicant: Rand Burzese, Ypsilanti, MI (US)

(72) Inventor: Rand Burzese, Ypsilanti, MI (US)

(73) Assignee: ISUZU MOTORS, LTD., Tokyo (JP)

( * ) Notice: Subject to any disclaimer, the term of this patent is extended or adjusted under 35 U.S.C. 154(b) by 123 days.

(21) Appl. No.: 15/470,290

(22) Filed: Mar. 27, 2017

(65) Prior Publication Data

US 2018/0272823 A1    Sep. 27, 2018

(51) Int. Cl.
*B60G 13/00* (2006.01)
*B60G 7/02* (2006.01)

(52) U.S. Cl.
CPC ............ *B60G 13/003* (2013.01); *B60G 7/02* (2013.01); *B60G 2206/601* (2013.01)

(58) Field of Classification Search
CPC .................. B60G 13/003; B60G 2206/601
See application file for complete search history.

(56) References Cited

U.S. PATENT DOCUMENTS

| | | | | |
|---|---|---|---|---|
| 1,407,431 A * | 2/1922 | MacLeod | ............. | B60R 19/285 293/140 |
| 1,629,672 A * | 5/1927 | Athons | .................. | B60G 11/04 267/42 |
| 2,901,240 A * | 8/1959 | Fikse | ..................... | B60G 11/60 105/198.6 |
| 2,913,252 A * | 11/1959 | Norrie | ..................... | B60G 5/04 105/198.1 |
| 3,491,994 A * | 1/1970 | Reynolds | ............... | B60G 11/12 267/269 |
| 5,431,363 A * | 7/1995 | Ezzat | ..................... | B60G 11/12 248/205.1 |
| 6,135,470 A * | 10/2000 | Dudding | ............... | B60G 11/28 280/124.128 |
| 6,240,679 B1 * | 6/2001 | Smalara | ................ | E04D 13/076 52/11 |
| 6,378,881 B2 * | 4/2002 | Stenvall | .................. | B60G 3/06 280/124.171 |
| 6,945,548 B2 * | 9/2005 | Dudding | ................. | B60G 7/04 267/122 |
| 7,234,713 B1 * | 6/2007 | Vander Kooi | .......... | B60G 9/00 280/124.106 |

(Continued)

FOREIGN PATENT DOCUMENTS

| | | | | |
|---|---|---|---|---|
| DE | 102014010648 A1 * | 1/2015 | ............. | B62D 21/02 |
| DE | 102016223861 A1 * | 5/2018 | ............... | B60G 7/02 |

(Continued)

OTHER PUBLICATIONS

Leaf Spring Shackle, https://www.am-autoparts.com/products/leaf-spring-shackles/AM-23707813.html, 3 pages, Mar. 8, 2017.

(Continued)

*Primary Examiner* — Nicole T Verley
(74) *Attorney, Agent, or Firm* — Brundidge & Stanger, P.C.

(57) ABSTRACT

A vehicle rear-suspension bracket includes a bracket having raised lateral portions. The bracket includes a bumper portion and a frame portion. The raised lateral portions create a lateral channel between the lateral portions that extends an entire length of the bracket.

4 Claims, 1 Drawing Sheet

(56) References Cited

U.S. PATENT DOCUMENTS

| | | | | |
|---|---|---|---|---|
| 7,416,204 B2* | 8/2008 | Hicks | ............... | B60G 7/02 280/124.128 |
| 7,503,414 B2* | 3/2009 | Pierce | ............... | B60G 9/003 180/209 |
| 7,513,329 B2* | 4/2009 | Nakashima | ............... | B60G 7/006 180/312 |
| 7,575,243 B2* | 8/2009 | Takahashi | ............... | B60G 7/02 280/124.11 |
| 8,348,290 B2* | 1/2013 | Mildner | ............... | B60G 21/052 280/124.109 |
| 8,770,604 B2* | 7/2014 | Brereton | ............... | B60G 7/001 280/124.108 |
| 8,973,975 B2* | 3/2015 | Saitou | ............... | B62D 21/15 296/187.09 |
| 9,038,968 B2* | 5/2015 | Hennon | ............... | F16L 3/1091 248/65 |
| 9,150,253 B2* | 10/2015 | Watanabe | ............... | B62D 21/11 |
| 9,434,423 B2* | 9/2016 | Pertlik | ............... | B62D 27/065 |
| 10,005,496 B2* | 6/2018 | Shin | ............... | B60G 15/068 |
| 2005/0062251 A1* | 3/2005 | Ramsey | ............... | B60G 7/02 280/124.153 |
| 2015/0059084 A1* | 3/2015 | Hocaoglu | ............... | E03C 1/18 4/633 |

FOREIGN PATENT DOCUMENTS

| | | | | |
|---|---|---|---|---|
| JP | 2000006631 A | * | 1/2000 | ............... B60G 7/04 |
| WO | WO-0196171 A1 | * | 12/2001 | ............... B60G 7/02 |
| WO | WO-2017095900 A1 | * | 6/2017 | ............... B60G 7/02 |

OTHER PUBLICATIONS

Rear Leaf Spring Bracket, http://www.ebay.com/itm/NEW-1992-1996-FORD-F150-F250-F350-BRONCO-REAR-LEAF-SPRING-BRACKET-F2UZ-5775-A-/142279171009?hash=item21207fdbc1:g:GUIAAOSwLnBX6CGT&vxp=mtr, 3 pages, Mar. 8, 2017.

* cited by examiner

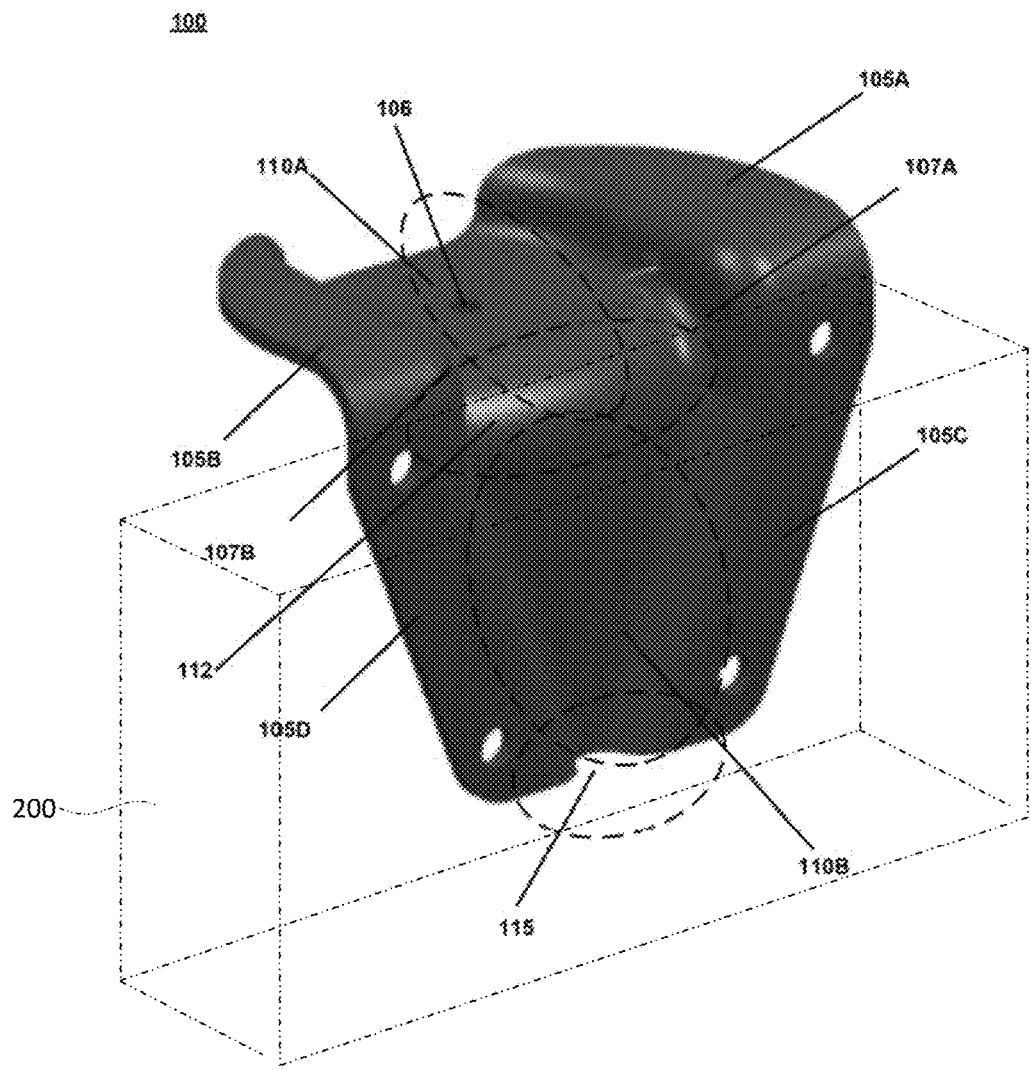

BRACKET WITH OPEN CHANNEL

BACKGROUND

The embodiments described herein pertain to variations of a rear axle bumper bracket.

Typically, a rear axle bumper bracket has a flat surface for mating with a vehicle frame forms a pocket or reservoir, relative to the vehicle frame, in which dirt and other debris accumulate. The accumulation of dirt and other debris can produce a corrosive effect on the vehicle frame.

SUMMARY

In one example embodiment, a vehicle rear-suspension bracket includes a bracket having raised lateral portions. The bracket itself includes a bumper portion and a frame portion. The raised lateral portions create a lateral channel between the lateral portions that extends an entire length of the bracket. The raised lateral portions corresponding to the bumper portion are substantially flush to a bottom portion of a rear bumper of the vehicle, and the raised lateral portions corresponding to the frame portion are curved downward so as to be substantially perpendicular to the bumper portion of the bracket and substantially flush to a rear suspension frame of the vehicle.

The foregoing summary is illustrative only and is not intended to be in any way limiting. In addition to the illustrative aspects, embodiments, and features described above, further aspects, embodiments, and features will become apparent by reference to the drawing and the following detailed description.

BRIEF DESCRIPTION OF THE DRAWINGS

In the detailed description that follows, embodiments are described as examples only since various changes and modifications will become apparent to those skilled in the art from the following detailed description.

FIG. 1 shows an example bracket with an open channel, in accordance with at least some of the implementations and/or embodiments described herein.

DETAILED DESCRIPTION

In the following detailed description, reference is made to the accompanying drawing, which forms a part of the description. In the drawings, similar symbols typically identify similar components, unless context dictates otherwise. Other embodiments may be utilized, and other changes may be made, without departing from the spirit or scope of the subject matter presented herein. It will be readily understood that the aspects of the present disclosure, as generally described herein and illustrated in the drawing, may be arranged, substituted, combined, separated, and designed in a wide variety of different configurations, all of which are explicitly contemplated herein.

FIG. 1 shows an example bracket 100 with an open channel 110, in accordance with at least some of the implementations and/or embodiments described herein.

As depicted, bracket 100 may include, at least, raised portions 105, open channel 110, curvature 112, and drainage opening 115. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of physical materials.

Bracket 100 may be utilized as an automotive rear-bumper suspension bracket intended to, at least, provide for drainage of and through a lower portion of the bracket.

Bracket 100 may be formed from of materials commonly or typically used for rear-bumper suspension brackets, including variations of metal, plastic, polyurethane, etc. Further, bracket 100 may be formed of one piece of such material or of a combination thereof, as molded or melded together.

Raised portions 105, generally, refer to lateral portions of bracket 100 that extend above open channel 110, and are positioned to lie flush against a bottom portion of an automotive rear bumper and an automotive rear-suspension frame.

FIG. 1 shows raised portions 105A and 105B on a bumper portion of bracket 100, and raised portions 105C and 105D on a frame portion of bracket 100. Raised portions 105A and 1058 are on opposite lateral portions of the bumper portion of bracket 100. For example, from an overhead viewing perspective of bracket 100 as it is mounted to a rear-suspension frame 200, raised portion 105A is on the left side of the bumper portion of bracket 100, and raised portion 1058 is on the right side of the bumper portion of bracket 100. Raised portions 105C and 105D are also on opposite lateral portions of the bumper portion of bracket 100. For example, from the aforementioned overhead viewing perspective of bracket 100, raised portion 105C is on the left side of the bumper portion of bracket 100, and raised portion 105D is on the right side of the bumper portion of bracket 100. Unless context otherwise requires, the continuing description may refer singularly to raised portion 105, left raised portion 105 and/or right raised portion 105.

The aforementioned bumper portion of bracket 100 may refer to the portion of bracket 100 that aligns with, and is detachably coupled to, an underside of a rear bumper of a vehicle. Referring to FIG. 1, lateral portions 105A and 105B are molded and/or formed to be substantially flush to a bottom portion of the rear bumper of the vehicle. A manufacturer may create or bore a hole 106 in a central region of open channel 110A, corresponding to the bumper portion of bracket 100, to thereby accommodate a fastening device, e.g., screw, to couple the bracket to the bottom portion of the rear bumper. Alternatively, or in addition, the manufacturer may create symmetrical holes in lateral portions 105A and 105B so that a fastening mechanism, e.g., screw, may be fitted therethrough and threaded into the bottom portion of the rear bumper.

Further, the bumper portion of bracket 100 may serve as a protective overhang for a jounce bumper. Therefore, bracket 100 may be molded and/or formed to extend outwardly, away from the rear-suspension frame 200 of the vehicle, to a length that at least matches the radius of the jounce bumper so as to provide the top of the jounce bumper with full coverage from water and debris.

The aforementioned frame portion of bracket 100 may refer to the portion of bracket 100 that aligns with, and is detachably coupled to, the rear-suspension frame 200 of the vehicle. Referring to FIG. 1, lateral portions 105C and 105D are molded and/or formed to be substantially flush to the rear-suspension frame 200 of the vehicle. A manufacturer may create or bore a hole in a central region of open channel 1108, corresponding to the frame portion of bracket 100, to thereby accommodate a fastening device, e.g., screw, to couple the bracket to the rear-suspension frame 200. Alternatively, or in addition, the manufacturer may create symmetrical holes in lateral portions 105C and 105D so that a fastening mechanism, e.g., screw, may be fitted therethrough and threaded into the rear-suspension frame 200.

The surface of the rear-suspension frame 200 to which lateral portions 105C and 105D are coupled is substantially perpendicular to the bottom surface of the rear bumper to which lateral portions 105A and 105B are coupled. Thus, bracket 100 may be molded and/or formed to curve downward, forming perpendicular curvature 112, so that the frame portion of bracket 100 is substantially perpendicular to the bumper portion of bracket 100. Curved portions 107A and 107B are illustrative examples, respectively, of the left and right sides of the bumper portion of bracket 100 curving downward so that the frame portion and the bumper portion are substantially 90° to each other.

Open channel 110 may refer to a channeled portion of bracket 100 that extends laterally for an entire length of bracket 100 between left raised portion 105 and right raised portion 105. Bracket 100 may be molded and/or formed to create open channel 100 to create a gap between a central portion of bracket 100 and with the rear portion of the bumper as well as with the rear-suspension frame of the vehicle. Further, open channel 110 may be open ended at a bottom thereof so that water and other fluids, as well as any debris, that collect in the bumper portion of bracket 100 or make contact with the frame portion of bracket 100 may be drained away. That is, with reference to FIG. 1, water, fluid, and/or debris that collect in bumper portion region 110A of open channel 110 may be drawn by gravity or forced by a continuing buildup of water, fluid, debris, etc., over curvature 107 and downward through frame region 110B of open channel 110. Because the frame region 110B of open channel 110 is open-ended, thus forming opening 115, any liquid and/or debris drawn from or forced over from the bumper region 110A of open channel 110 is drawn away from the bracket as well as the jounce bumper, thus reducing any hazardous buildup. As a result, corrosion or deterioration caused by the buildup of liquid and/or debris may be eliminated or, at the very least, significantly warded off.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A vehicle rear-suspension bracket, comprising:
   a bracket having raised lateral portions, the bracket comprising:
   a top portion; and
   a frame portion;
   wherein:
   the frame portion curves substantially perpendicular downward from the top portion, and extends to a bottom of the bracket;
   the raised lateral portions comprising a first raised lateral portion and a second raised lateral portion,
   the first raised lateral portion and the second raised lateral portion create a lateral channel therebetween that extends an entire length of the bracket from the top portion of the bracket to the frame portion of the bracket,
   the first raised lateral portion and the second raised lateral portion corresponding to the frame portion are curved downward so as to be substantially perpendicular to the top portion of the bracket and are substantially flush to a frame of the vehicle, and
   the lateral channel corresponding to the frame portion opens at a lower end thereof in a state where the bracket is coupled to the frame,
   wherein the lateral channel extending through the length of the frame portion of the bracket creates a gap between a central portion of the bracket and the frame of the vehicle,
   wherein the first raised lateral portion corresponding to the frame portion is provided with a first upper hole and a first lower hole,
   wherein the second raised lateral portion corresponding to the frame portion is provided with a second upper hole and a second lower hole, and
   wherein, in a width direction of the lateral channel, a distance between the first lower hole and the second lower hole is less than a distance between the first upper hole and the second upper hole.

2. The vehicle rear-suspension bracket of claim 1, wherein the lateral channel extending through the length of the frame portion of the bracket is open ended at a bottom thereof so that fluid and debris that collect in the top portion or make contact with the frame portion are drawn downward to the bottom of the bracket to be drained away.

3. The vehicle rear-suspension bracket of claim 1, wherein the lateral channel extending through the length of the frame portion of the bracket is open ended at a bottom thereof to eliminate a buildup of debris between the bracket and the frame of the vehicle.

4. The vehicle rear-suspension bracket of claim 1, wherein the lateral channel extending through the length of the top portion of the bracket creates a gap between a central portion of the bracket and the bottom portion of the vehicle, wherein further the lateral channel extending through the length of the top portion of the bracket declines in a direction towards the frame portion of the bracket, and wherein, over entire length of the lateral channel, the lateral channel corresponding to the frame portion has a width decreasing toward the bottom of the bracket.

* * * * *